G. I. TRUMP.
PACKING FOR PISTONS.
APPLICATION FILED JULY 26, 1915.
1,179,682.
Patented Apr. 18, 1916.
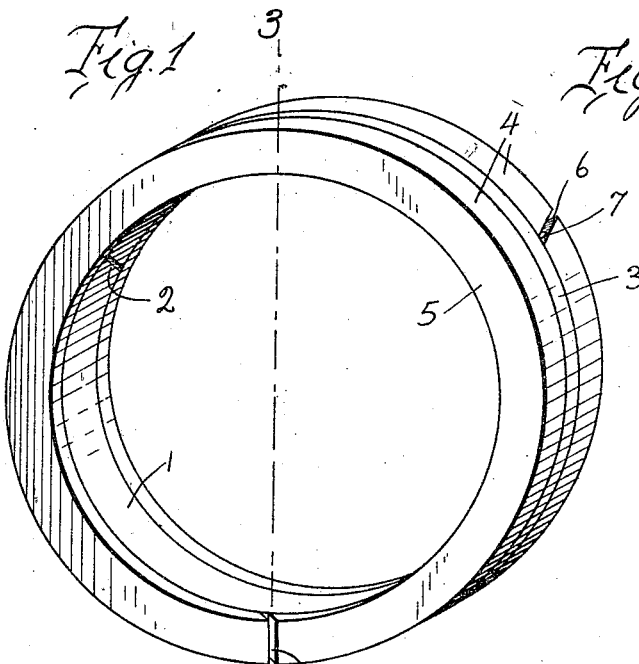
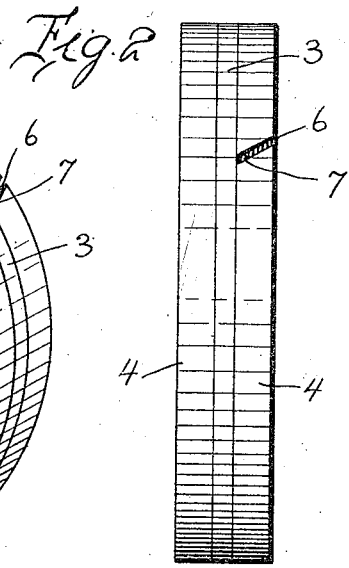
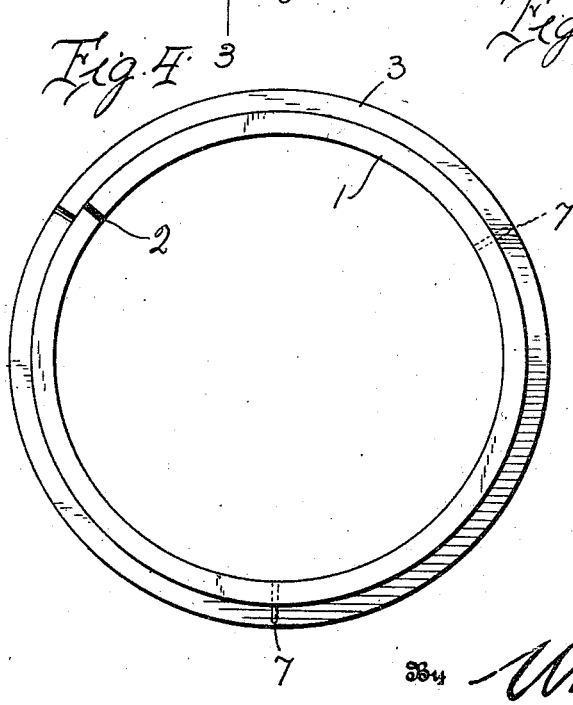
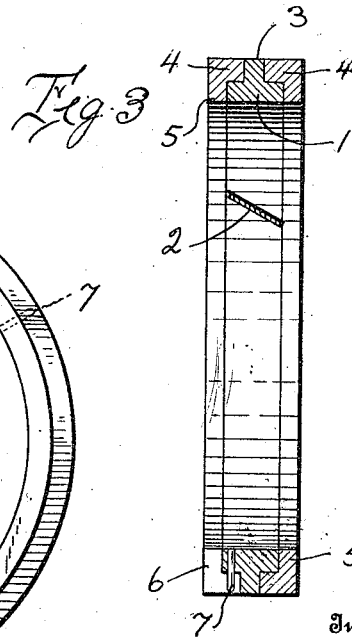
Inventor
G. I. TRUMP
By Watson E. Coleman
Attorney

UNITED STATES PATENT OFFICE.

GEORGE I. TRUMP, OF CROWN POINT, INDIANA.

PACKING FOR PISTONS.

1,179,682.  Specification of Letters Patent.  Patented Apr. 18, 1916.

Application filed July 26, 1915. Serial No. 41,939.

*To all whom it may concern:*

Be it known that I, GEORGE I. TRUMP, a citizen of the United States, residing at Crown Point, in the county of Lake and State of Indiana, have invented certain new and useful Improvements in Packing for Pistons, of which the following is a specification, reference being had to the accompanying drawings.

This invention relates to certain improvements in packing for pistons, and it has relation more particularly to a device of this general character especially designed and adapted for use in connection with gas engines; and it is an object of the invention to provide a novel and improved packing whereby the possibility of gas or oil passing said ring is substantially entirely eliminated.

Furthermore, it is an object of the invention to provide a novel and improved packing comprising three split ring members having their split portions equidistantly spaced one relative to the other to assure the expansion of the packing to be equally divided.

The invention consists in the details of construction and in the combination and arrangement of the several parts of my improved packing for pistons whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is an isometric view of a packing constructed in accordance with an embodiment of my invention; Fig. 2 is a view in end elevation of the device as disclosed in Fig. 1; Fig. 3 is a sectional view taken substantially on the line 3—3 of Fig. 1; and Fig. 4 is a view in side elevation of the intermediate or main ring of my improved packing.

As disclosed in the accompanying drawings, 1 denotes the intermediate or main ring of my improved packing, the same being split, as indicated at 2, said split being on an angle of substantially 45°. The periphery of the intermediate ring 3 at the transverse center thereof is provided with the annular flange 3 to the opposite sides of which are positioned the supplemental rings 4, the peripheries of which being flush with the periphery of the flange 3 and each of said supplemental rings is provided with a depending flange 5 overlying a side of the intermediate or main ring 1, and it is to be particularly observed that the free edges of the flanges 5 are flush with the inner wall of the intermediate ring 3. By this arrangement, it will be perceived that the possibility of gas or oil passing my improved packing is substantially entirely eliminated as the intermediate or main ring 1 will serve to obstruct any gas or oil which may pass the supplemental rings 4. Each of the rings 4 is also split, as indicated at 6, the cut being disposed on an angle of 45° and in assembling the several rings of my improved packing the cuts are equidistantly spaced one relative to the other whereby the expansion of the packing is equally divided. This in practice is an essential feature in order to produce a leak proof packing.

In order to maintain the cuts of the several rings 1 and 4 in their equidistantly spaced relation, I provide the ring 1 at opposite sides of the flange 3 and equidistantly spaced relative to the slit or cut 2 and each other, with the radially disposed pins 7 which are positioned within the cuts or slits 6 and thus serve to hold the supplemental rings 4 against axial displacement relative to the ring 1.

From the foregoing description, it is thought to be obvious that a packing for pistons constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A packing for pistons comprising a main split ring having a peripheral flange at its transverse center, and supplemental split rings disposed at opposite sides of the flange of the main ring and provided with depending flanges overlying the sides of the main ring, the cuts of the supplemental rings being equidistantly spaced relative to each other and to the cut of the main ring, the peripheries of the supplemental rings and the flange of the main ring being flush, the free edges of the flanges of the supplemental rings and the inner wall of the main ring being also flush.

2. A packing for pistons comprising a main split ring having a peripheral flange at its transverse center, supplemental split rings disposed at opposite sides of the flange of the main ring and provided with depending flanges overlying the sides of the main ring, the cuts of the supplemental rings being equidistantly spaced relative to each other and to the cut of the main ring, the peripheries of the supplemental rings and the flange of the main ring being flush, the free edges of the flanges of the supplemental rings and the inner wall of the main ring being also flush, and studs radiating from the main ring at opposite sides of the flange thereof and disposed within the cuts of the supplemental rings.

In testimony whereof I hereunto affix my signature in the presence of two witnesses.

GEORGE I. TRUMP.

Witnesses:
EDWIN F. KNIGHT.
JOSEPH E. BROWN,